July 3, 1956
J. W. BOAKES, 2ND
2,752,862
VALVE OPERATING SYSTEM
Filed April 19, 1951
2 Sheets-Sheet 1
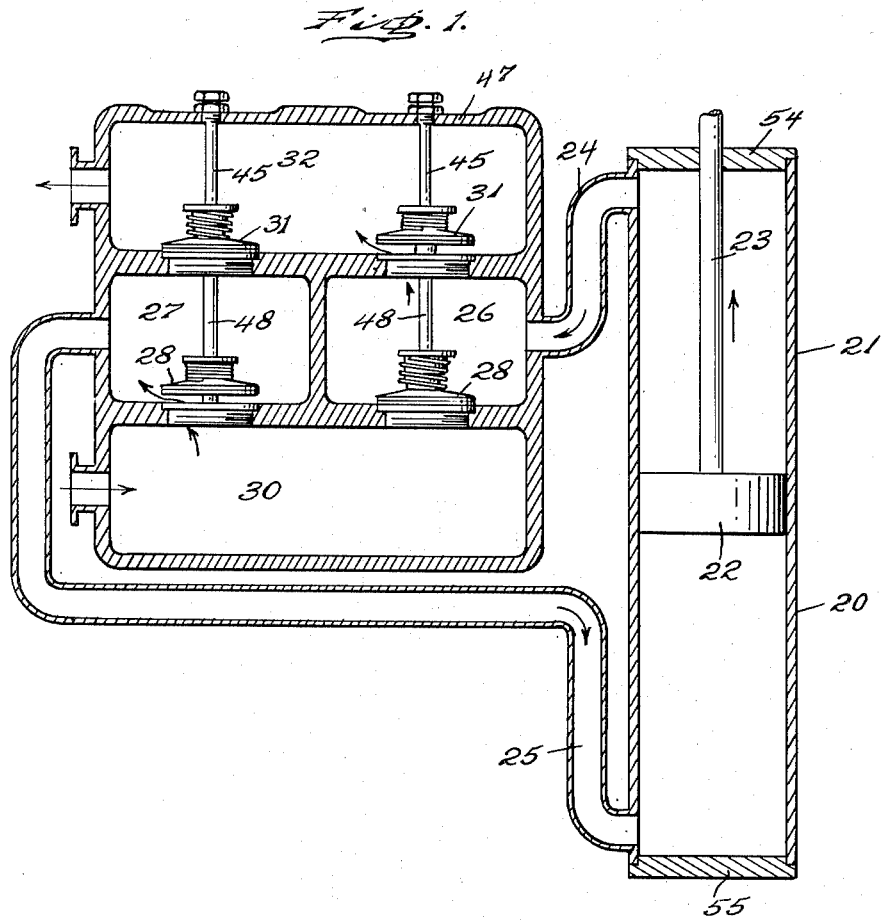
INVENTOR
James Walter Boakes, 2nd.
BY
ATTORNEYS.

July 3, 1956
J. W. BOAKES, 2ND
2,752,862
VALVE OPERATING SYSTEM
Filed April 19, 1951
2 Sheets-Sheet 2
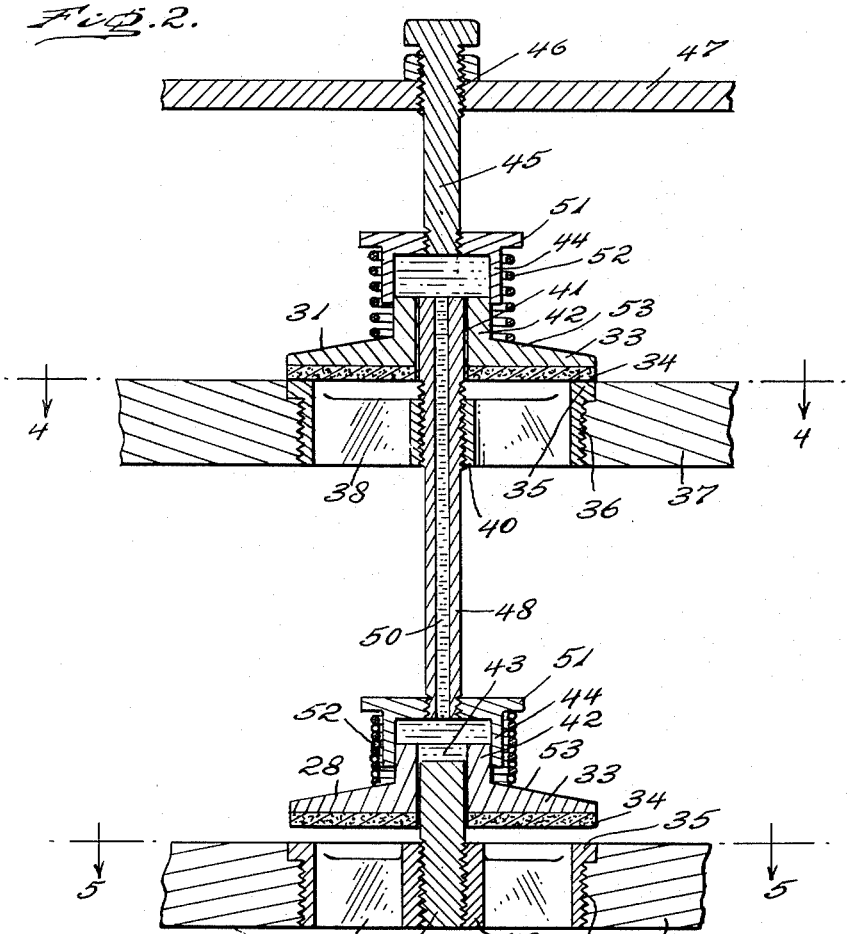
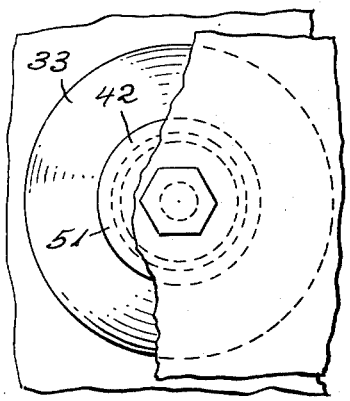
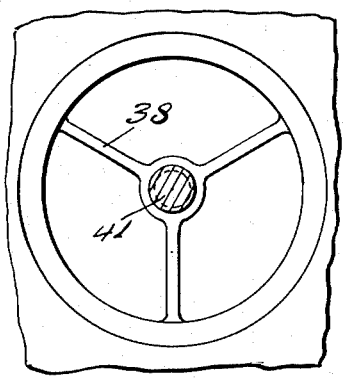
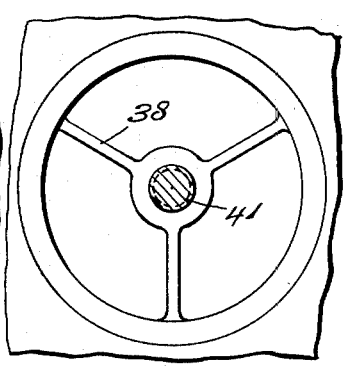
INVENTOR
James Walter Boakes, 2nd
BY
ATTORNEYS.

United States Patent Office 2,752,862
Patented July 3, 1956

2,752,862
VALVE OPERATING SYSTEM

James Walter Boakes 2nd, Woodbury, N. J.

Application April 19, 1951, Serial No. 221,825

6 Claims. (Cl. 103—227)

The present invention relates to valve mechanism for pumps and the like.

A purpose of the invention is to obtain more rapid action of pump valves, and particularly to avoid the tendency of valves to hang in open position.

A further purpose is to eliminate the tendency of the inlet valve to close more slowly than the outlet valve opens on the discharge stroke, and to create an impulse from the opening of the outlet valve to close the inlet valve.

A further purpose is to impart fluid actuation to the pump valves so that either valve will assist the other in moving in the appropriate direction where the particular valve lags behind.

A further purpose is to employ a fluid interconnection between the respective valves.

A further purpose is to mount each valve on a guiding stem, to provide a piston extension on the valve which operates in cylinder, and to interconnect the fluid in the cylinder of one valve with that in the cylinder of another valve.

A further purpose is to mount the spring returns of the valves around the cylinders and to cause the springs to act between the cylinders and the valves themselves.

A further purpose is to provide sufficient looseness of fit so that the fluid in the cylinders can come from leakage into the cylinders of the fluid pumped.

A further purpose is to support the cylinders of the valves on rods, to interconnect the cylinders through one of the rods and to extend one of the rods to form the guiding stem of one of the valves.

Further purposes appear in the specification and in the claims.

In the drawings I have chosen to illustrate one only of the numerous embodiments in which my invention may appear, selecting the form shown from the standpoints of convenience in operation, satisfactory illustration and clear demonstration of the principles involved.

Figure 1 is a diagrammatic axial section of a double acting reciprocating pump to which the invention has been applied.

Figure 2 is an axial section of one of the sets of valves in Figure 1 to enlarged scale.

Figure 3 is a top plan view of Figure 2, with the upper support partially broken away.

Figure 4 is a section on the line 4—4 of Figure 2.

Figure 5 is a section on the line 5—5 of Figure 2.

Describing in illustration but not in limitation and referring to the drawings:

The efficiency of many pumps, especially of the reciprocating type, is often reduced by the tendency of one or other of the valves to lag behind in operation. This is true of the inlet valve on the discharge stroke, which frequently tends to close more slowly than the outlet valve opens. It is therefore said that the inlet valve "hangs." This hanging of the inlet valve permits a certain amount of regurgitation into the inlet at the beginning of the discharge stroke, which should desirably be avoided.

On the suction stroke a similar action occurs, although it is there less important. This feature of the tendency of the outlet valve to hang on the suction stroke may permit some liquid already discharged to flow back into the valve chamber, especially where several pumps or pump actions are discharging in different phase relationships.

Accordingly the present invention is designed particularly to make whichever valve tends to lag undergo its appropriate action more rapidly and more closely in step with the valve which tends to move more rapidly.

There is nevertheless according to the invention, a slight resilience or freedom permitted due to the employment of hydraulic means, and also preferably due to the feature that the piston and cylinder preferably do not make a tight fit. Thus the tendency to "slap" a particular valve closed due to the opening of another valve will be minimized.

In order to employ the invention to greatest advantage, the inlet and outlet valves of a given set are desirably co-axial and the respective valves are preferably guided on co-axial stems. Each of the valves is desirably provided with a piston extension opposite to the valve seat, and the piston extension cooperates with a cylinder which has fluid interconnection with the cylinder of the opposite valve. The spring returns for the valves may also desirable act between the cylinders and the valves themselves. In the preferred embodiment a rod mounting one of the cylinders makes the fluid connection between the cylinders and also forms one of the guiding stems.

It will be understood that the mechanism employed is very simple and does not add greatly to the complexity of the valve structure. The opening of the outlet valve compresses a fluid in an outlet valve cylinder which flows through a fluid connection to the corresponding inlet valve cylinder and tends to assist in the closing of the corresponding inlet valve. Likewise when the outlet valve closes on the suction stroke, the opening of the inlet valve tends to assist that action by transmitting fluid pressure from the inlet valve cylinder to the outlet valve cylinder. While it would be possible to employ a fluid different from the fluid pumped, it is desirable to use the same fluid for assisting the valve action which is pumped by the pump, and this is readily accomplished by using loose fits in the cylinders.

The pump as shown in Figure 1 may be considered to be any suitable pump, in this case a direct acting reciprocating pump 20 having a cylindrical cylinder 21 of circular cross section, fitted by a piston 22 operated in reciprocation by a piston rod 23 from a suitable prime mover such as a steam engine. The opposite ends of the cylinder have connections 24 and 25 respectively to valve chambers 26 and 27 to which the appropriate inlet valve 28 controls inlet from an inlet chamber 30, and from which the appropriate outlet valve 31 controls outlet to an outlet chamber 32.

Each of the valves is desirably of disc type as shown, consisting of a metallic disc-like valve element 33 having a gasket or sealing face 34 suitably of resilient nonmetallic material united to the disc, and cooperating in seating position with a valve seat 35 threaded at 36 into a partition wall 37. The valve seat has an inwardly extending spider 38 which carries at the interior a threaded socket 40 which mounts a threaded shank or stem 41 extending suitably outwardly from the seat to guide the valve. Each one of the valves has at the side remote from the valve seat a suitably cylindrical piston extension 42. An opening 43 through the gasket 34, the valve disc 33 and the piston extension 42 slightly larger than the stem 41 provides guiding action for the valve on the stem so that the valve, while free to move, is restrained against angular or lateral displacement. The clearance between the stem and the opening 43 is suitably adequate to provide for a slight leakage into the valve cylinder as later explained.

Each of the piston extensions 42 is surrounded by a cup-like cylinder 44 which is supported at the side of the valve remote from the valve seat and engages the sides of the piston extension with sufficient freedom permitted for the valve to move. There is desirably a slight clearance to permit leakage between the piston extension and the inside of the cylinder as later explained. The cylinder of the outlet valve is supported by rod 45 which threads into the closed end of the cylinder, and adjustably threads at 46 into the end wall 47 of the outlet chamber. The cylinder of the inlet valve is supported by an extension 48 of the outlet valve stem, the extension and the outlet valve stem having a through bore 50 which interconnects the outlet and inlet valve cylinders of a given pair of valves.

Each one of the cylinders at its closed end has an outwardly extending flange 51 which acts as a spring abutment, and a spiral compression spring 52 surrounds the cylinder and the piston extension and acts between the flange 51 and the outwardly extending skirt 53 of the valve to urge the valve toward closure.

It will be evident that by the device of the invention, there is always a fluid interconnection between one valve and another of a pair of inlet and outlet valves, and this fluid connection tends to make the valves move together and prevent one valve from lagging behind the other valve of the pair. Due to the fact, however, that the fluid system allows some yielding, it will be evident that there is not rigidity or tendency to impact which would be present if a mechanical interconnection were used instead of a fluid interconnection.

In operation it will be evident that once the valves, valve seats, cylinders and springs are assembled as shown, the two valves of any given pair of inlet and outlet valves will avoid the tendency to hang or lag. Thus when the piston is moving toward the end 54 of the pump cylinder in Figure 1, fluid is pumped out of the upper portion of the pump cylinder into valve chamber 26, tending to open outlet valve 31 of valve chamber 26 and close inlet valve 28. The opening of outlet valve 31 causes the piston extension of that valve to move up in its valve cylinder and force fluid through the bore 50 into the valve cylinder of inlet valve 28. The entry of fluid into the valve cylinder of inlet valve 28 tends to force the inlet valve closed.

At the same time, the part of the main pump cylinder toward end 55 on the stroke of the piston toward end 54 is drawing in fluid medium from valve chamber 27. This tends to open inlet valve 28 and close outlet valve 31 of this chamber. The opening of the inlet valve causes its piston extension to rise in its valve cylinder, forcing fluid into the valve cylinder of the outlet valve, and the entry of fluid into the outlet valve cylinder forces the outlet valve closed and prevents the possibility that the outlet valve would close more slowly that the inlet valve opens.

When the piston has completed its stroke in Figure 1 toward end 54 and moves toward end 55, there is a reversal, and again the valve which is opening of any pair of valves tends to assist in closing the valve which is closing. Therefore it is possible to obtain an acceleration of valve action and an increase in pump efficiency.

I find that a clearance of one to two thousandths of an inch between the valve and the stem and between the piston extension and the valve cylinder is adequate to allow the fluid medium pumped to fill the space inside the valve cylinders, but is not large enough to cause excessive leakage which would interfere with the valve action.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. A pump having an inlet valve and cooperating seat and an outlet valve and cooperating seat, the valves respectively opening and closing in response to the action of the fluid in the pump, a fluid cylinder and piston interconnected with the inlet valve and having motion of the piston to reduce the cylinder space when the inlet valve opens, a fluid cylinder and piston interconnected with the outlet valve and having motion of the piston to reduce the cylinder space when the outlet valve opens, and fluid connections between the space in one cylinder and the space in the other cylinder placing the same in a closed system, there being no external connection to the system in normal operation, whereby the closing of the inlet valve is assisted by the opening of the outlet valve.

2. A pump or the like having an inlet valve seat, a cooperating inlet valve movable with respect to the inlet valve seat in response to pumping conditions, an outlet valve seat and a cooperating outlet valve movable with respect to the outlet valve seat in response to pumping conditions, in combination with a piston extension from the inlet valve in the direction away from the inlet valve seat, a fluid cylinder cooperating with the piston extension from the inlet valve and positioned at the end of the piston extension remote from the inlet valve, a piston extension from the outlet valve at the side of the outlet valve remote from the outlet valve seat, a fluid cylinder cooperating with the piston extension from the outlet valve at the side of the outlet valve remote from the outlet valve seat, walls forming a passage connecting the inside of the fluid cylinder for the inlet valve to the inside of fluid cylinder for the outlet valve into a closed system, there being in normal operation no external connection open to the closed system, a fluid medium in the passage and the fluid cylinders and spring means urging each valve away from the fluid cylinder and toward seating.

3. A pump having an inlet valve seat, a guiding stem extending from the inlet valve seat in the direction in which the valve opens, an inlet valve guided on the stem and cooperating with the inlet valve seat, an inlet valve piston extension on the inlet valve on the side remote from the inlet valve seat, a fluid cylinder cooperating with the piston extension on the side of the inlet valve remote from the inlet valve seat, an outlet valve seat, a tubular guiding stem extending from the outlet valve seat in the direction in which the outlet valve opens, said tubular guiding stem having a pipe extension to the fluid cylinder of the inlet valve, an outlet valve guided on the outlet valve stem and cooperating with the outlet valve seat, a piston extension from the outlet valve on the side of the outlet valve away from the outlet valve seat and a fluid cylinder cooperating with the piston extension on the outlet valve on the side of the outlet valve remote from the seat, the fluid cylinders, piston extensions and pipe extensions forming in normal operation a fluid system without external connections.

4. A pump having an inlet valve seat, a guiding stem extending from the inlet valve seat in the direction in which the valve opens, an inlet valve guided on the stem and cooperating with the inlet valve seat, an inlet valve piston extension on the inlet valve on the side remote from the inlet valve seat, a fluid cylinder cooperating with the piston extension on the side of the inlet valve remote from the inlet valve seat, an outlet valve seat, a tubular guiding stem extending from the outlet valve seat in the direction in which the outlet valve opens, said tubular guiding stem having a pipe extension to the fluid cylinder of the inlet valve, an outlet valve guided on the outlet valve stem and cooperating with the outlet valve seat, a piston extension from the outlet valve on the side of the outlet valve away from the outlet valve seat, a fluid cylinder cooperating with the piston extension on the outlet valve on the side of the outlet valve remote from the outlet valve seat and spring means acting between each of the fluid cylinders and the respective valve to urge the valve toward closure, the fluid cylinders, piston extensions and pipe extensions forming in normal operation a fluid system without external connections.

5. A pump or the like having an inlet valve seat, a cooperating inlet valve movable with respect to the inlet valve seat in response to pumping conditions, an outlet valve seat, and a cooperating putlet valve movable with respect to the outlet valve seat in response to pumping conditions, in combination with a piston extension from the inlet valve in the direction away from the inlet valve seat, a fluid cylinder cooperating with the piston extension from the inlet valve and positioned at the end of the piston extension remote from the inlet valve, a piston extension from the outlet valve at the side of the outlet valve remote from the outlet valve seat, a fluid cylinder cooperating with the piston extension from the outlet valve at the side of the outlet valve remote from the outlet valve seat, walls forming a passage connecting the inside of the fluid cylinder for the inlet valve to the inside of the fluid cylinder for the outlet valve, the fluid cylinders, piston extensions and passage forming in normal operation a fluid system without external connections a fluid medium in the passage and the fluid cylinders and spring means urging each valve away from the fluid cylinder and toward seating, there being a loose leaking fit in one of the fluid cylinders which admits pump fluid to fill the same.

6. A pump having an inlet valve seat, a guiding stem extending from the inlet valve seat in the direction in which the valve opens, an inlet valve guided on the stem and cooperating with the inlet valve seat, an inlet valve piston extension on the inlet valve on the side remote from the inlet valve seat, a fluid cylinder cooperating with the piston extension on the side of the inlet valve remote from the inlet valve seat, an outlet valve seat, a tubular guiding stem extending from the outlet valve seat in the direction in which the outlet valve opens, said tubular guiding stem having a pipe extension to the fluid cylinder of the inlet valve, an outlet valve guided on the outlet valve stem and cooperating with the outlet valve seat, a piston extension from the outlet valve on the side of the outlet valve away from the outlet valve seat, and a fluid cylinder cooperating with the piston extension on the outlet valve on the side of the outlet valve remote from the outlet valve seat, the fluid cylinders, piston extensions and pipe extension forming in normal operation a fluid system without external connections there being a loose leaking fit in one of the fluid cylinders which admits pump fluid to fill the same for initial operation.

References Cited in the file of this patent
UNITED STATES PATENTS

| | | |
|---|---|---|
| 521,731 | Riegelmann | June 19, 1894 |
| 560,550 | Smith | May 19, 1896 |
| 584,533 | Worthington | June 15, 1897 |
| 657,671 | Petsche | Sept. 11, 1900 |
| 723,387 | Hill | Mar. 24, 1903 |
| 756,993 | Unzicker | Apr. 12, 1904 |
| 818,567 | Sergeant | Apr. 24, 1906 |